(12) United States Patent
Richards et al.

(10) Patent No.: US 7,198,698 B1
(45) Date of Patent: Apr. 3, 2007

(54) METHOD OF PHOTOCHEMICALLY REMOVING AMMONIA FROM GAS STREAMS

(75) Inventors: John R. Richards, Cary, NC (US); David G. Goshaw, Chapel Hill, NC (US)

(73) Assignee: Air Control Techniques, P.C., Cary, NC (US)

( * ) Notice: Subject to any disclaimer, the term of this patent is extended or adjusted under 35 U.S.C. 154(b) by 0 days.

(21) Appl. No.: 10/643,062

(22) Filed: Aug. 18, 2003

Related U.S. Application Data

(63) Continuation-in-part of application No. 10/269,204, filed on Oct. 11, 2002, now abandoned, which is a continuation-in-part of application No. 09/847,476, filed on May 2, 2001, now Pat. No. 6,541,677, which is a continuation-in-part of application No. 10/098,759, filed on Mar. 14, 2002, now Pat. No. 6,770,174.

(51) Int. Cl.
 *B01D 53/00* (2006.01)
(52) U.S. Cl. .................................. 204/157.3
(58) Field of Classification Search ............ 204/157.3; 588/227, 257
See application file for complete search history.

(56) References Cited

U.S. PATENT DOCUMENTS 4,416,748 A * 11/1983 Stevens ................ 204/157.3
5,219,544 A *  6/1993 Kupper et al. ........... 423/239.1

* cited by examiner

*Primary Examiner*—Edna Wong
(74) *Attorney, Agent, or Firm*—Coats & Bennett, P.L.L.C.

(57) ABSTRACT

The present invention entails a method of removing ammonia from a gas stream. The method entails irradiating the gas stream with light in the spectral range of 200–350 nanometers and disassociating hydrogen free radicals from ammonia to form $NH_2$. Once $NH_2$ is formed, then reacting the $NH_2$ with $NO_x$ to form $N_2$ and water. In one specific embodiment of the present invention, the method entails removing ammonia from a gas stream associated with a cement producing process. In particular, a raw feed is directed into a pyroprocessing system of a cement manufacturing facility. This raw feed is heated and in the process of producing cement, a gas stream results. Ammonia present in the gas stream is removed or substantially reduced by irradiating the gas stream and disassociating hydrogen free radicals from the ammonia to form $NH_2$. $NH_2$ is then reacted with $NO_x$ to form water.

7 Claims, 3 Drawing Sheets

METHOD OF PHOTOCHEMICALLY REMOVING AMMONIA FROM GAS STREAMS

CROSS REFERENCE TO RELATED APPLICATIONS

This is a continuation-in-part of U.S. patent application Ser. No. 10/269,204 filed Oct. 11, 2002, now abandoned which was a continuation-in-part of U.S. patent application Ser. No. 09/847,476 filed May 2, 2001, now U.S. Pat. No. 6,541,677, and U.S. patent application Ser. No. 10/098,759 filed Mar. 14, 2002, now U.S. Pat. No. 6,770,174.

FIELD OF THE INVENTION

Photochemically initiated free radical reactions involving nitrogen oxides ($NO_x$), carbon monoxide (CO), hydrocarbons, and water vapor are used to oxidize ammonia gas in the effluent gas streams leaving nitrogen oxides control systems. It is known that selective catalytic reduction (SCR) systems and selective noncatalytic reduction (SNCR) systems generate limited quantities of ammonia gas. The ability to control nitrogen oxides by SCR and SNCR systems is often limited by the need to avoid high concentrations of ammonia and by the formation of ammonium compounds that can accumulate on industrial heat exchange equipment and air pollution control systems. The process disclosed herein is typically installed downstream from nitrogen oxides control equipment used on coal, oil, and natural gas-fired boilers and cement kilns. The photochemically free radical reactions result in the oxidative destruction of the ammonia.

BACKGROUND OF THE INVENTION

The control of nitrogen oxides (primarily nitric oxide, NO, and nitrogen dioxide, $NO_2$) is an important national goal. Nitrogen oxide emissions contribute to the formation of smog, fine particulate matter (often termed PM2.5), and regional haze. Nitrogen oxides also participate in the atmospheric reactions that lead to the formation of acid rain. To control nitrogen oxides, the Clean Air Act includes numerous significant requirements that apply to stationary sources such as fossil-fuel fired boilers, wood waste fired boilers, municipal waste incinerators, medical waste incinerators, cement kilns, and other industrial processes. Industrial sources are presently applying a variety of nitrogen oxides control techniques either alone or as combinations of systems to achieve the $NO_x$ control limitations that become effective in the near future.

Selective noncatalytic reduction (SNCR) systems can be installed on a variety of fossil fuel and waste fuel fired combustion systems and on cement kilns. SNCR systems inject either ammonia or urea reagent into the combustion gas stream at a point in the combustion or kiln process where the gas temperature is in the range of 1600° F. to 2000° F. In this temperature range, the ammonia or urea reagents react with the $NO_x$ compounds, which are then chemically reduced to harmless diatomic nitrogen, $N_2$. Due to the limitations of reagent mixing in the gas stream and the limited residence time of the gas stream in the critical temperature range, a portion of the ammonia and urea reagents fails to react. Ammonia gas is emitted from both ammonia and urea based SNCR systems. These emissions are termed ammonia "slip" and are usually in the range of 2 ppm to 40 ppm. To minimize ammonia emissions, operators of SNCR systems must often reduce the quantity of ammonia or urea reagent injected (stoichiometric ratio of reagent to $NO_x$) into the system and, thereby, also reduce the overall extent of $NO_x$ emission reduction. The limits of $NO_x$ reduction efficiency of SNCR systems due to ammonia slip related problems are described in technical papers by Hurst & White (361), Jones (961), Quartacy et al. (250), Moilanen et al (576), Gullett et al (597), Pachy et al. (598), and Sun et al. (956).

Selective catalytic reduction (SCR) systems use a vanadium pentoxide-titanium dioxide-tungsten oxide or zeolite catalyst bed mounted in a portion of the combustion system effluent gas stream that is at temperatures of 500° F. to 1000° F. Ammonia reagent is injected into the combustion gas stream before it reaches the catalyst bed. In the presence of the catalyst, the ammonia chemically reduces the nitrogen oxides. SCR systems can achieve high NOx reduction efficiencies when stoichiometric levels of ammonia reagent are used; however, some of the ammonia can penetrate the SCR system. SCR system operators must often reduce the rate of ammonia injection in order to avoid undesirable levels of ammonia slip. This reduces the NOx control efficiency of the SCR system. The ammonia slip imposed limitation to the performance of SCR systems is described further in technical papers by Donnelly et al. (88), Durilla et al. (1170), Buschmann et al. (116), The U.S. Department of Energy (978), and Gullett (597).

In addition to SNCR systems and SCR systems, operators of fossil fuel-fired boilers, waste-fired incinerators, and cement kilns often use modified combustion system operating conditions, low $NO_x$ burners, and gas reburning systems to suppress NOx concentrations before the gas streams to be treated reach the SNCR and/or SCR equipment. When these $NO_x$ concentration suppression techniques are used to their maximum design limits, additional organic compounds are formed and remain in the gas stream. The process disclosed here benefits from the presence of these organic compounds, which serve as participants in the free radical chain reactions used to destroy ammonia gas.

Available ammonia control techniques are not well suited for the control of ammonia gas emissions from $NO_x$ control systems. Ammonia scrubbers, such as those used in some chemical industry sources, use packed bed, tray tower, and spray tower absorbers. All of these scrubbers are designed for ammonia gas concentrations substantially higher than the concentrations generated by SNCR and SCR systems operating at or near their design limits. These conventional ammonia wet scrubbers have poor efficiencies for gas streams having low ammonia gas concentrations. Furthermore, the wet scrubbers require large vessels and liquid handling systems and, thereby, cannot be retrofitted into many existing boiler stations having limited space. The liquid streams from the scrubbers must be treated to prevent contaminant releases to surface waterways or the groundwater.

Conventional ammonia scrubbers do not provide an economically feasible and practical means to control ammonia emissions from $NO_x$ systems.

Photochemical destruction of volatile organic compounds (VOCs) is known. U.S. Pat. No. 3,977,952 discloses a process for the decomposition of one or more carbon-containing compounds such as in an industrial waste or flue gas containing volatile organic compounds, oxygen, and water vapor. The method is carried out by exposing humidified gas to radiation of a wavelength of about 20 to 600 nanometers.

In some industrial processes, such as pyroprocessing of cement, recovery of the particulate matter solids produces material that is of economic importance. A discussion of dry sorption methods is found in U.S. Pat. No. 6,080,281 teaching an emission control process using photocatalytic and nonphotocatalytic aerogels for adsorption, and exposing the photocatalytic aerogel material containing adsorbed VOCs to ultraviolet (UV) radiation resulting in VOC destruction.

U.S. Pat. No. 4,210,503 discloses a direct photolysis method for controlling gaseous emissions, particularly vinyl chloride, by exposing the emissions to UV light and, thereafter, absorbing such decomposition products in a scrubber that substantially eliminates the vinyl chloride and most other decomposition products from the effluent stream.

U.S. Pat. No. 4,981,650 discloses a method to remove dioxin-contaminated waste by extraction in a liquid capable of extracting dioxins. A hydrogen donor is added to the extracting solvent or later during addition of an activating agent. The dioxin-containing liquid extract is treated in a direct photolysis reactor that contains immersion UV lamps.

U.S. Pat. No. 5,045,288 discloses the removal of halogenated and non-halogenated volatile and non-volatile organic contaminants from a gaseous stream by mixing a gaseous oxygen bearing substance with the contaminated gaseous stream, contacting the mixture with a solid photocatalyst, and exposing the photocatalyst and organic components to UV light having a wavelength up to 600 nanometers. The catalyst is pre-selected to prevent formation of a liquid phase.

U.S. Pat. No. 5,417,825 discloses a thermal photolytic process that uses high temperatures in combination with radiation exposure to induce a photochemical reaction to detoxify a wide variety of organic pollutants, for example, chlorinated aromatic hydrocarbons. The hydrocarbons are treated in the gaseous phase by heating the gas to a temperature greater than 200° C., preferably 600° C. to 800° C., and exposing the heated gas to radiation at wavelengths of less than 280 nanometers, preferably from 185 nanometers to 280 nanometers, for at least two seconds.

U.S. Pat. No. 5,650,549 teaches a photothermal process for the detoxification of chlorinated aromatic hydrocarbons contained in a gas stream. The chlorinated aromatic hydrocarbons are heated to a temperature of greater than 200° C. to form a gas stream, or a pre-existing chlorinated aromatic hydrocarbon containing gas stream is produced from a combustion source at a temperature of greater than 200° C. The gas stream is exposed to radiation at a wavelength of less than 280 nanometers for at least one second to convert the chlorinated aromatic hydrocarbons nontoxic reaction products, and the gas stream is released to the atmosphere.

U.S. Pat. No. 5,839,078 discloses a method of direct vitrification of nuclear waste comprising the steps of providing waste in the form of relatively small pieces with vitrifiable material, providing a high intensity light source of sufficient power to cause melting and subsequent vitrification of said waste, and cooling and storing of said vitrified material.

U.S. Pat. No. 5,342,582 discloses an apparatus for reprocessing special wastes of photopolymerizable scrap material to produce domestic waste, comprising a housing equipped with a feed hopper, at least one UV emitter arranged in the housing to irradiate and heat the scrap material, and a chopper arranged in the housing to comminute the scrap material. The photocrosslinkable and thermally crosslinkable scrap is composed of, for example, dry resist, solder resist, color proof films, screen printing films, and the like, which form special waste because of their reactive constituents.

U.S. Pat. No. 5,476,975 discloses a method for photodegradation of a solution of organic toxic chemicals recoverable from contaminated wood products by the use of a supercritical fluid by exposing the extracted solution to UV in the presence of a photosensitizer.

U.S. Pat. No. 5,935,525 discloses a pre-treatment system and an air treatment system for abatement of contaminated air that includes pollutants such as VOCs, $NO_x$, and/or carbon monoxide (CO). The air stream is treated using UV light under conditions that produce hydroxyls, peroxides, and other oxidants without the formation of ozone. These oxidants are also used in the activated air with activated water being formed as an aqueous solution (vapor) of the activated air. The pre-treatment system includes a quenching zone where activated water is misted into the air stream, followed by alternating reaction zones and depletion zones where activated air is added and then turbulently mixed with the air stream. The air treatment system includes a primary treatment tunnel, a carbon bed system, an activated air generator, and a sparger tank farm. Activated air produced by the generator is added to water while being exposed to UV light in the sparger tank farm. As the contaminated air stream moves through various sequential chambers within the tunnel, it is subjected to the misted activated water while being simultaneously exposed to UV radiation. Air exiting the tunnel is then further treated in the carbon bed system.

U.S. Pat. No. 6,179,971 discloses a two-step process for air purification comprising a photolytic step followed by a photocatalytic step, each of which entails radiation treatment to convert contaminants into less harmful products. The method provides a photolytic stage having a source of UV radiation and a downstream photocatalytic stage using a photocatalyst and a source of UV radiation.

U.S. Pat. No. 5,538,537 discloses a method of desulfurizing furnace flue gases laden with sulfur dioxide ($SO_2$) comprising cooling the flue gases to a temperature near but above the dew point thereof and flowing the cooled flue gases through a bed of granular cement stone sorbent prepared from a mixture of cement and water. The sorbent laden with pollutants from the flue gases can be further processed directly in an advantageous manner in a cement plant, for example, by grinding it together with cement clinker or separately therefrom and thereby adding it as a component, for example as a gypsum component, to a cement that is to be produced, so that no disposal problems exist for the sorbent laden with pollutants. With the addition of ashes or fly ashes from coal or fluosolids furnaces, a particularly environmentally friendly means for disposal of these ashes can be achieved simultaneously if a sorbent laden with pollutants from the flue gases is further processed for the production of cement (together with cement clinker). Sorbent is produced. It is advantageous to use it with a grain size of greater than 1 mm, preferably approximately 4 to 20 mm. A mixture of granulated cement stone and carbonaceous sorption material then forms the sorbent used according to the invention, which is brought into contact with flue gases that are to be purified.

U.S. Pat. No. 4,634,583 discloses a method for the desulfurization of a calcium-containing flue gas stream from a firing system such as a cement-making plant wherein at least partially deacidified, hot, raw cement meal is added to the flue gas at selected points to adsorb the sulfur oxides onto the calcium present in the gas. No additional adsorption agents, for example, activated carbon, pure calcium oxide, milk of lime, or the like are used. Raw cement meal having an adequately high proportion of free calcium oxide is conveyed to the conduit of the exhaust gas to be desulfurized. The preferred method comprises suspending the deacidified raw cement meal in the flue gas in the form of a cloud of airborne dust and, thereafter, separating the dust from the flue gas after the sulfur oxides have been bonded to the calcium.

U.S. Pat. No. 5,137,704 discloses a process for decreasing the $NO_x$ content of exhaust gases from cement-burning kilns by an addition of ammonia and/or ammonia-containing substances to the hot exhaust gases. The exhaust gases are desulfurized at a temperature from 50° C. to 100° C. in a dry or semidry process by a mixture of raw cement powder and calcium hydroxide. The mixed solids that have been removed from the exhaust gas in a dry state in the desulfurizing stage are returned to the exhaust gas stream at temperatures from 850° C. to 1,000° C.

Treatment methods for pollutant-bearing gas in a corona discharge device is a known method of removing the pollutants. A general review of this technique is provided in Puchkarev et al., "Toxic Gas Decomposition by Surface Discharge," Proceedings of the 1994 International Conf. on Plasma Science, Jun. 6–8, 1994, Santa Fe, N.M., paper No. 1E6, page 88. Corona discharge systems used for removal of mercury are disclosed in U.S. Pat. No. 5,591,412.

Injection of activated carbon in waste gas effluent is known. See U.S. Pat. Nos. 4,196,173; 4,889,698; 5,053,209; 5,607,496; and 5,672,323.

SUMMARY OF THE INVENTION

In a basic aspect, the invention provides a photochemically initiated set of free radical reactions involving nitrogen oxides, carbon monoxide, hydrocarbons, water vapor, and ammonia that result in the oxidation of ammonia gas in the effluent gas stream of an industrial process. It is desirable to prevent the formation of undesirable byproducts, therefore, the light intensity and/or the time exposed to UV irradiation are limited to ensure that the conversion of NO to $NO_2$ is not complete and that the sum of NO and $NO_2$ (termed $NO_x$) is not substantially reduced. In a preferred process it is desirable that the initial $NO_x$ concentration not be reduced by more than 50%. The treated gases are released directly to the atmosphere after treatment.

In one embodiment, the present invention involves irradiation of an ammonia-containing gas stream within the last stage of an SCR catalyst bed and/or on the process gas side of boiler air preheaters. The reactions initiated in the hot, particulate matter-laden gas stream result in the destruction of ammonia gas before it can react with sulfuric acid and other sulfur-containing gases to form sticky deposits of ammonium bisulfate and/or ammonium sulfate. The irradiation employed is ultraviolet light. The treatment of ammonia with radiation in accordance with the invention is especially efficient when employing UV sources that emit light in the spectral range of 230 to 370 nanometers under conditions typically encountered in industrial effluent gas streams containing less than 50 ppm of ammonia. The radiation of the ammonia gas stream results in the rapid and efficient direct photolytic destruction of ammonia due to free radical related hydrogen abstraction from the ammonia molecule prior to release of the effluent gas stream to the atmosphere. The process leads to the formation of diatomic nitrogen, $N_2$.

In another embodiment, the present invention involves irradiation of an ammonia-containing gas stream within the last stage of an SCR catalyst bed and/or on the process gas side of boiler air preheaters using ultraviolet light having wavelengths between 230 nanometers to 370 nanometers.

Further, the present invention entails a method for treating an industrial production process that emits a gaseous effluent stream containing ammonia, and comprises the following:
 a) oxidizing ammonia in the industrial effluent gas stream by direct photochemical oxidation in the absence of added photocatalyst by irradiating the gas stream with UV light after removal of particulate matter
 b) oxidizing ammonia in the industrial effluent gas stream by direct photochemical oxidation in the absence of added photocatalyst by irradiating the gas stream with UV light prior to the removal of particulate matter while the industrial gas stream is passing through the last stage of the SCR catalyst bed.

Various specific and/or preferred aspects are specified herein below, and other objects and advantages of the present invention will become apparent and obvious from a study of the following description and the accompanying drawings that are merely illustrative of such invention.

DETAILED DESCRIPTION OF THE INVENTION

Figure 1:
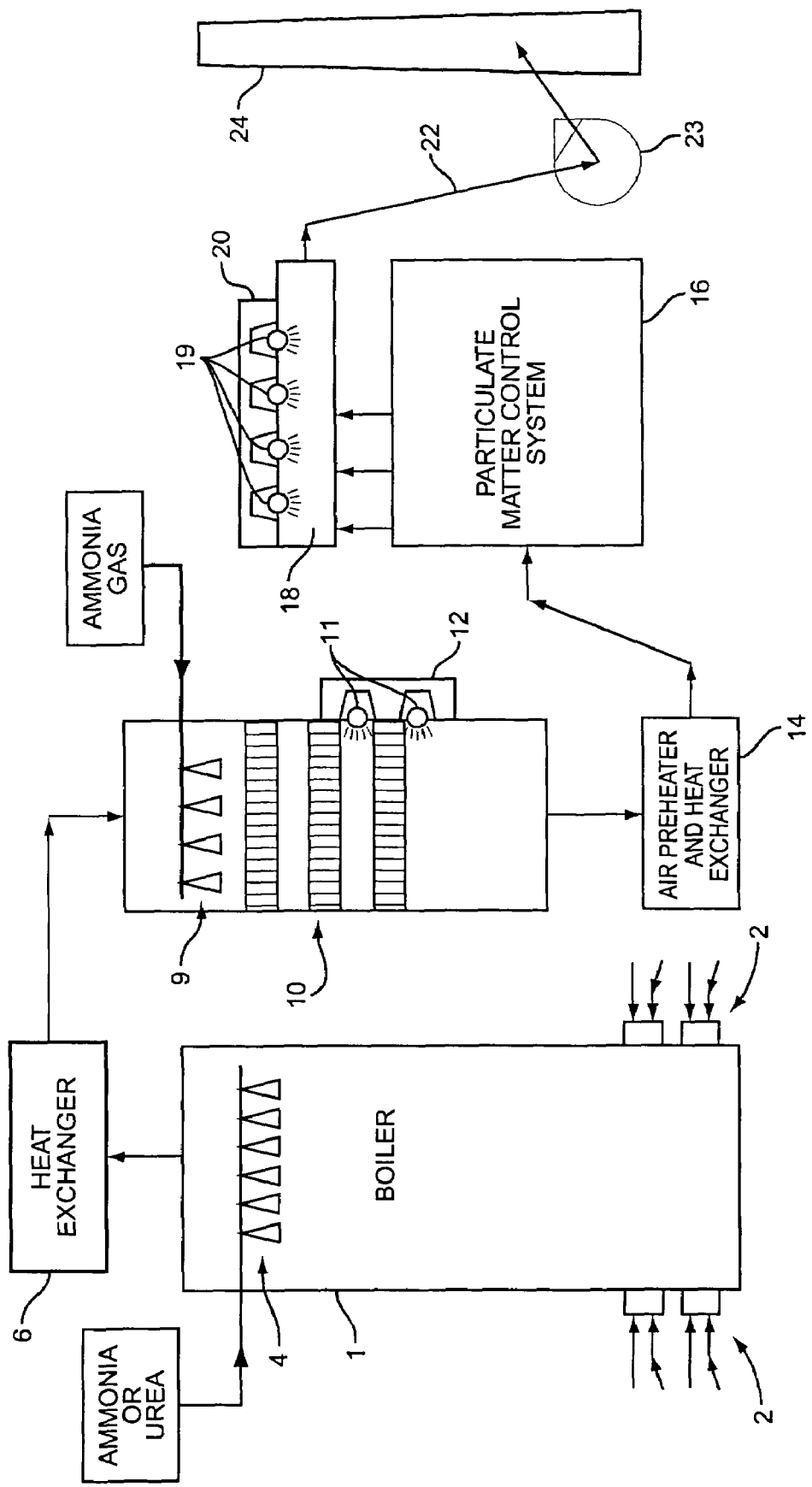
FIG. 1 is a schematic illustration of the ammonia destruction process of the present invention illustrating the removal of ammonia gas from an the effluent gas stream of an industrial process having either an SCR and/or SNCR $NO_x$ control system.

The ammonia destruction process is applicable to a number of industrial processes, such as coal, oil, and natural gas-fired boilers, wood-fired boilers, waste-fired incinerators, and portland cement plants. In the case of cement plants, the present invention entails irradiating the effluent gas stream that passes from a pyroprocessing system of the cement plant. In this regard, the gas streams are treated in Stage I and Stage II controls with nonphotocatalyzed direct photolysis using irradiated UV light in the spectral range of 230 to 370 nanometers. Stage I control occurs in a particulate matter-laden gas stream located close to the location of ammonia gas generation in the industrial process stream and is intended to protect downstream equipment from corrosive and sticky ammonium compounds. Stage II control is performed in a gas stream that has been treated in a high efficiency particulate matter control system to reduce the particulate matter concentrations by a factor of 95% to 99.9%. Stage II control is performed to minimize the release of ammonia gas to the atmosphere.

Particulate matter control devices coupled to irradiation sources employed herein are preferably high efficiency filters and can be selected from among several conventional devices, such as electrostatic precipitators, reverse gas fabric filters, and pulse jet fabric filters. A preferred arrangement includes the use of irradiation sources in an outlet manifold or duct carrying treated gas from the high efficiency particulate matter control system. Alternatively, irradiation can be performed within the electrostatic precipitator, reverse air fabric filter, or pulse jet fabric filter. The radiation beams are generally directed parallel to the direction of gas flow in the outlet manifold or in the high efficiency particulate matter control systems.

Conventional UV irradiating sources are employed. The radiation source may comprise any conventionally generated UV radiation. Radiation in a spectral range of 230 to 370 nanometers is preferred in Stage I and in the preferred spectral range of 230 to 370 nanometers in Stage II treatments, such as by lamps with arc emission such as xenon, mercury, or xenon-mercury, or with pulsed or continuous lasers. Other available sources of UV light may be used. The source of radiation may be located outside the irradiation zones and emitted through sealed quartz windows protruding through the structural wall of the zones. Preferably, the source of radiation is located inside the photochemical reaction zone.

The number of UV emitting devices used in Stage I processing in the treatment of elevated ammonia gas can vary in relation to the heated gas flow rate, the residency time, and/or the concentration of ammonia and the concentration of organic compounds in the gas stream. A recommended intensity range is from 200 to 2,000 microwatts/cm$^2$ measured at 254 nanometers and 1,000 to 20,000 microwatts/cm$^2$ measured at 360 nanometers. Light absorption levels from 1 to 100 microwatts per exposed cubic feet of gas are effective in conversion of ammonia to lesser toxic byproducts. Excessive irradiation levels could form free radical byproducts from ammonia and the co-present organic compounds, which are preferably minimized by establishing the optimum UV light treatment conditions, e.g., gas volume, temperature, organic compounds concentrations, and residency time estimated or measured in the irradiating zones. The residence time of gas in Stage I can vary. In one embodiment of the process, the residence time would be approximately 0.5 to 12 seconds. To ensure that the formation of undesirable byproducts are avoided, it is preferable that the light intensity and residence time be limited to avoid a reduction of more than 50% of the $NO_x$ (total of NO and $NO_2$) and to avoid a $NO_2$/NO ratio of greater than 10.

The ammonia gas that is not destroyed in the adsorption step of Stage I remains in the effluent gas stream, which is directed through the high efficiency particulate matter control device. The gas phase ammonia in the effluent gas stream exiting the particulate matter control device is exposed to UV radiation in the spectral range of 230 to 370 nanometers to photochemically oxidize the ammonia. The direct photolytic oxidation of ammonia remaining in the effluent gas stream from the particulate matter control device is termed Stage II control.

The Stage II photoreactor, generally comprises a manifold or duct leading from the high efficiency particulate matter control device or a structural housing that surrounds and/or supports a high efficiency particulate removal treatment zone.

Referring to FIG. 1, wherein like numerals depict like features or components, there is shown therein a multi-stage system that comprises a fossil fuel, wood fuel, or waste fuel fired boiler 1 handling hot combustion gases generated in the flames of burners 2 mounted in boiler 1 and combusting fuel and air directed to the burners. The fuel and air can be received at burners 2 as pulverized solid material, liquids, or solids having size ranges from 100 micrometers to more than 4 inches diameter. Hot combustion gases formed due to the combustion of the fuel and air are formed and moved upward in the refractory lined combustion chamber that comprise the walls of boiler 1. The hot combustion gases containing nitrogen oxides, organic compounds, and particulate matter are exposed to a spray of ammonia or urea from one or more sets of nozzles 4 mounted in an area of the boiler 1 where the gases are in the temperature range of 1600° F. to 2000° F. The ammonia or urea spray 4 that is part of the SNCR system results in the chemical reduction of $NO_x$ to $N_2$ and the typical formation of 2 ppm to 40 ppm ammonia gas in the combustion gas stream exiting the combustion zone of the boiler 1.

The hot ammonia-containing gases are treated in a series of heat exchangers 6 such as superheaters, reheaters, and feed water economizers to recover sensible heat and, thereby, reduce the gas temperature to the range of 500° F. to 1,000° F. The effluent gas stream from the heat exchange equipment 6 is then exposed in some industrial processes to ammonia spray 9 that is part of the SCR system. The ammonia gas introduced from ammonia spray nozzles 9 reacts with $NO_x$ remaining in the gas stream on the surface of catalyst beds 10. The resulting combustion gas stream exiting the catalyst beds 10 has substantially reduced $NO_x$, approximately 2 ppm to 40 ppm ammonia, organic compounds, and particulate matter.

A series of UV lights or lamps 11 are mounted in or are protruding through the walls of a lamp housing 12 mounted around or adjacent the downstream catalyst bed 10. This set of lamps is termed Stage I. In one embodiment, lights 11 are oriented to irradiate the gas as it enters, passes through, and exits the last SCR catalyst bed. Disposed around the lights 11 is the lamp housing 12 for mounting and cooling the lights 11. Air having a temperature that provides cooling, such as ambient air or air recycled from a portion of a gas stream is directed through the lamp housing 12 to maintain the temperature surrounding the lamps 11.

The combustion gas stream exiting the Stage I treatment area is directed to one or more heat exchangers 14 to remove sensible heat from the combustion gases. These heat exchangers can include feed water economizers and air preheaters. The cooled combustion gas stream then enters a high efficiency particulate matter control system 16 such as an electrostatic precipitator, reverse air fabric filter, or pulse jet fabric filter. Combustion gases with the substantially reduced particulate matter concentration enter an outlet manifold or duct 18 to transport the treated gas stream to a fan 23 and stack 24.

With reference to FIG. 1, Stage II control includes a set of UV lamps 19 and a lamp housing 20. Additionally, cooling air can be directed through the housing 20 to cool the UV lamps 19. In Stage II, the frequency of radiation of the filtered gas should be in a range of from 230 to 370 nanometers, preferably from 250 to 320 nanometers. The lamps 19 should have an intensity selected so as to provide about 200 to 2,000 microwatts/cm$^2$ measured at 254 nanometers and 1,000 to 10,000 microwatts/cm$^2$ measured at 360 nanometers resulting in light absorption levels of from 1 to 100 microwatts per cubic feet of irradiated gas. A recommended residency time for Stage II irradiation is approximately 0.5 to 12 seconds. This residency time and irradiation intensity are preferably limited to the extent necessary to ensure that no more than 50% of the inlet $NO_x$ is lost and that the $NO_2$/NO ratio following photochemical free radical chain reaction treatment does not exceed 10. Alternatively, the UV lamps can be provided within the high efficiency particulate matter control device and oriented to direct the irradiation beam with a maximum path length. The temperature of irradiated gas passing underneath the lamps 19 can be held in a range of from 200° F. to 700° F. and is preferably maintained in a range of from 200° F. to 400° F. These temperature ranges can be varied from the above suggested range and yet provide effective treatment of gas, depending on factors that will be apparent to one of ordinary skill given the compositional and process parameters actually encountered.

Connected to the outlet manifold or duct 18 is an outlet duct 22 that junctions to the fan 23 that is operative to expel and direct the filtered, irradiated gas stream into stack 24. As an option, there could be provided a series of UV lights associated with the stack 24 and operating in a spectral range above 230 nanometers. This set of stack mounted lights would continue the photolytic destruction of ammonia that occurs naturally due to sunlight when the gas stream is expelled from the stack.

It is contemplated that the lamps or lights 19 are advantageously selected so as to provide an intensity of 200 to 2,000 microwatts per square centimeter measured at 254 nanometers and 1,000 to 20,000 microwatts per square centimeter measured at 360 nanometers and thereby result in light absorption levels of 1 to 100 microwatts per actual cubic foot of gas treated. It is appreciated and within the spirit and scope of the invention to establish operable settings of light intensity to avoid the formation of photochemical free radical reaction byproducts. The formation of undesirable byproducts is avoided by controlling light intensity and/or irradiation time to the extent necessary to avoid converting more than 50% of the total inlet $NO_x$ to compounds other than NO and $NO_2$ and by keeping the $NO_2/NO$ concentration ratio at values less than 10. In a typical process, it is contemplated that the $NO_x$ concentration maintained in the gas stream being treated would be on the order of 50 to 300 ppm. This should be sufficient to maintain an active set of free radical chain reactions.

The residency time in the outlet manifold or duct 18 can be varied, but under typical conditions encountered, the residency time of the gas stream is approximately 0.5 to 12 seconds. It may be desirable to limit the residence time in the irradiation chamber to avoid the formation of photochemical-free radical reaction by products.

The chemical reactions involved in Stage I and Stage II are identical and are summarized below. It is understood that these reactions are provided only to illustrate the operation of the process and do not include all of the hundreds to thousands of free radical reactions initiated in high temperature, high gas concentration photochemically initiated free radical chain reactions.

The principal reactions providing for the removal of ammonia include irradiating the gas stream and through irradiation, disassociating hydrogen atoms from the ammonia to form $NH_2$. Thereafter reacting the $NH_2$ with NO or $NO_x$ to form nitrogen gas and/or water. Some of the disassociated hydrogen atoms form $H_2O$. Other disassociated hydrogen atoms form hydroperoxy ($HO_2$) free radicals that continue to initiate oxidation reactions with the ammonia. More particularly, the hydroperoxy free radicals react with ammonia and effectively pull a hydrogen atom from the ammonia molecule.

Stage I and Stage II Reactions

Principal Ammonia Reactions

| | |
|---|---|
| $NH_3+OH. \rightarrow NH_2.+H_2O$ | Reaction 1 |
| $NH_3+HO_2. \rightarrow NH_2.+H_2O_2$ | Reaction 2 |
| $NH_3+HO_2. \rightarrow NH_2.+2OH.$ | Reaction 3 |
| $NH_2.+NO \rightarrow N_2+H_2O$ | Reaction 4 |

Principal Photolysis Reactions

| | |
|---|---|
| $NO_2+h\nu(270-370 \text{ nanometers})O(^3P).+NO$ | Reaction 5 |
| $O_3+NO \rightarrow NO_2+O_2$ | Reaction 6 |
| $O_3+h\nu(250-306 \text{ nanometers}) \rightarrow O(^1D).+O_2(\Delta_g)$ | Reaction 7 |
| $H_2O_2+h\nu(<370 \text{ nanometers}) \rightarrow 2HO.$ | Reaction 8 |
| $RCHO+h\nu(<370 \text{ nanometers}) \rightarrow R.+CHO.$ | Reaction 9 |
| $N_2O_4+h\nu(250-310 \text{ nanometers})NO+NO_2+O(^3P).$ | Reaction 10 |

Principal Free Radical Reactions

| | |
|---|---|
| $H.+O_2 \rightarrow HO_2$ | Reaction 11 |
| $O(^3P).+O_2 \rightarrow O_3$ | Reaction 12 |
| $O(^1D)+H_2O \rightarrow 2HO.$ | Reaction 13 |
| $O(^1D).+H_2O \rightarrow O(^3P).+H_2O$ | Reaction 14 |
| $HO.+CO \rightarrow H.+CO_2$ | Reaction 15 |
| $H.+O_2 \rightarrow HO_2.$ | Reaction 16 |
| $HO_2.+NO \rightarrow HO.+NO_2$ | Reaction 17 |
| $O_3+RHC=CHR \rightarrow RCHO_2.+RCHO$ | Reaction 18 |
| $RO_2.+NO \rightarrow RO.+NO_2$ | Reaction 19 |
| $R.+O_2(+M) \rightarrow RO_2.(+M)$ | Reaction 20 |
| $HO.+RH \rightarrow H_2O+R.$ | Reaction 21 |

Where: M=Third body molecule, R=Alkyl substituted group (ie. H, $CH_3$)

Figure 3:
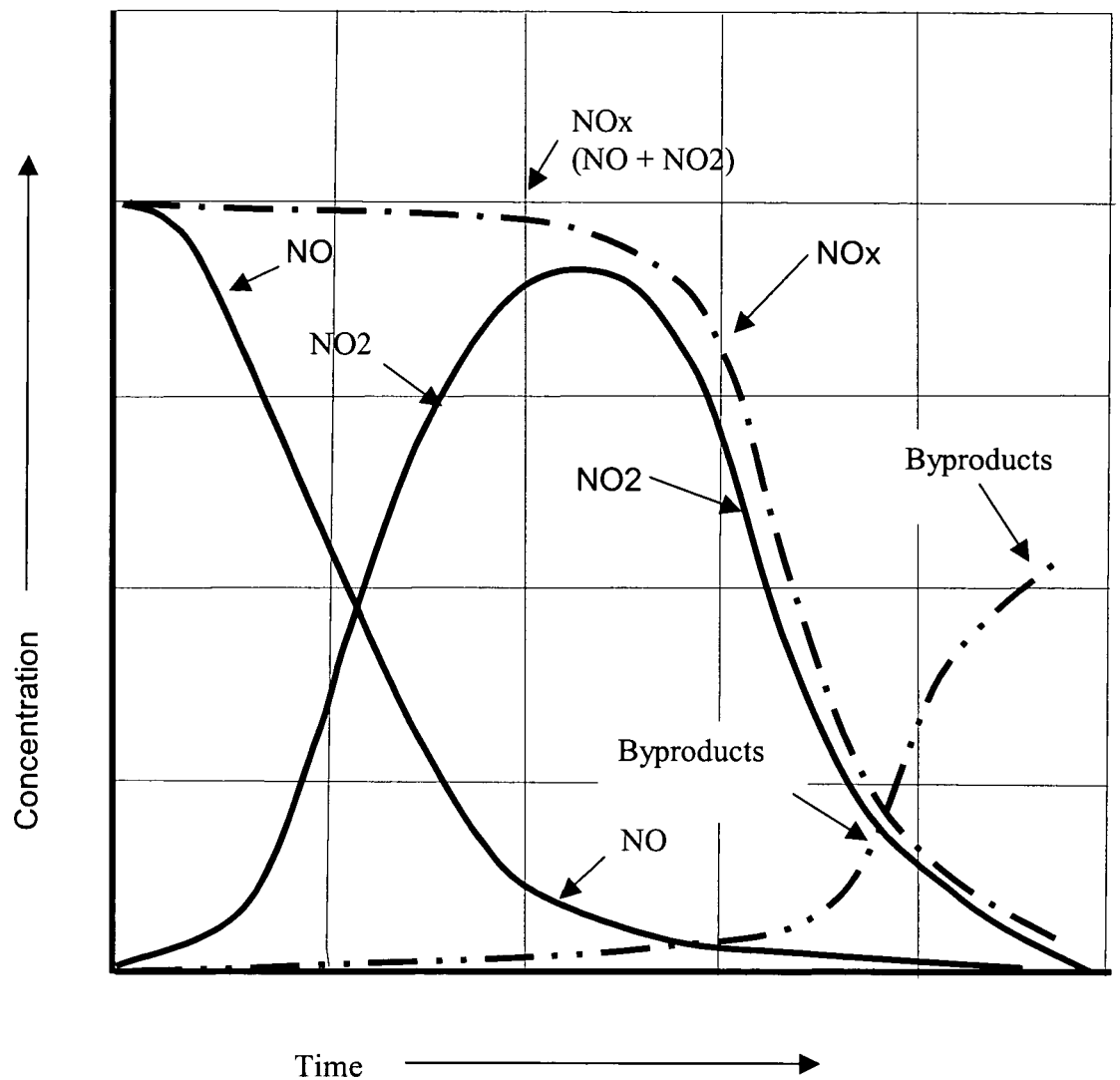
FIG. 3 illustrates concentration profiles for free radical chain reactions initiated in a gas mixture of $NO_x$, CO, hydrocarbons and water vapor.

These reactions collectively result in a predictable pattern to NO, $NO_2$, ammonia, $O_3$, and byproduct concentration profiles. These concentration profiles existing in the photochemical process equipment are similar to the concentration profiles observed over much longer time periods in polluted air undergoing smog reactions. As indicated in FIG. 3, as the irradiation time proceeds, NO is first converted to $NO_2$ due to a variety of reactions, especially 6 and 17. $NO_2$ photolysis is due to UV absorption. Carbon monoxide, water vapor, and hydrocarbons participate in this free radical chain reaction by creating additional $HO_2$ and $RO_2$ free radicals that can convert NO to $NO_2$. During this time, hydroxy (OH) and $HO_2$ free radicals are available to remove a hydrogen atom from ammonia as indicated in Reactions 1, 2, and 3. During the time that NO and $NO_2$ are present in abundance, the formation of undesirable byproducts such as ozone and nitrates is avoided. However, after irradiation proceeds beyond the peak in the $NO_2$ concentration curve, the free radical chain reactions can result in the formation of these byproducts. Accordingly, the irradiation time and/or intensity must be minimized to avoid free radical chain reactions beyond the $NO_2$ peak. This peak is indicated by $NO_2/NO$ concentrations ratios in excess of 10 and by a total $NO+NO_2$ concentration that is less than 50% of the initial $NO+NO_2$ concentration.

The process described above for reducing or minimizing ammonia gas in an industrial gas stream can be applied to many industrial processes either with or without SNCR or SCR $NO_x$ control systems. One particular application of the present process and system is to cement manufacturing facilities that, in some case, have a tendency to form ammonia gas due to the thermal breakdown and reactions of organic nitrogenous compounds such as amines present in low concentrations in the limestone feed to the kilns. The thermal reactions of the kiln feed can result in the formation of ammonia gas in the concentration range of 2 ppm to 250 ppm.

Figure 2:
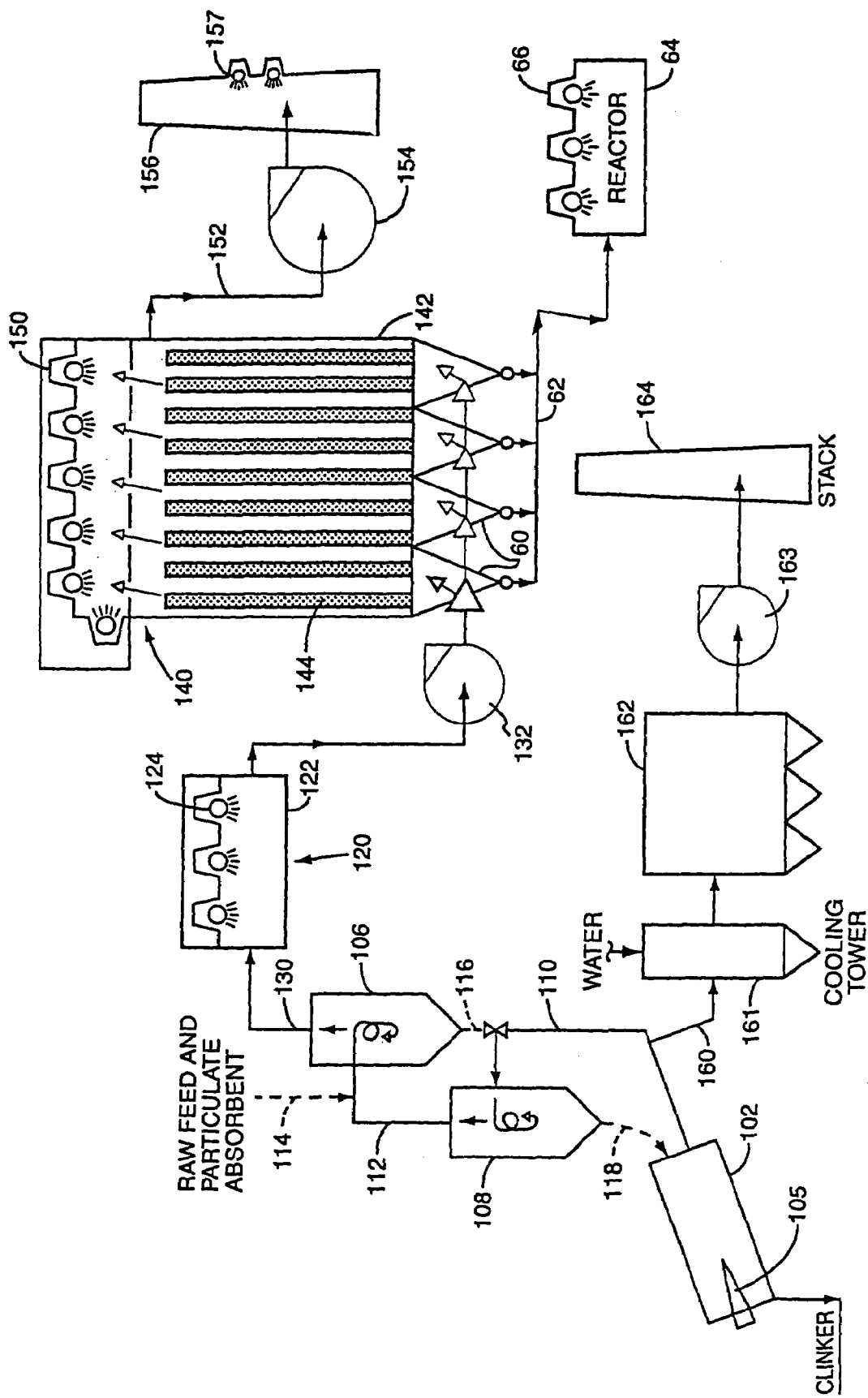
FIG. 2 is a schematic illustration of the application of the ammonia destruction process for the removal of ammonia from a cement kiln effluent gas stream formed due to the volatilization of nitrogenous material in the raw kiln feed entering the kiln pyroprocessing system in a counterflow direction.

The components of a conventional cement or portland cement manufacturing facility relevant to the invention are depicted in FIG. 2, which is a schematic illustration of effluent streams downstream of a kiln. Aspects of a conventional cement manufacturing facility (not illustrated) are well known and are beyond the scope of this disclosure. A cement manufacturing facility typically comprises a pyroprocessing system including a rotary kiln 102 having a burner 105 disposed in the outlet end thereof, and a preheater tower. In the preheater tower, there is included a series of cyclones, such as illustrated at 106 and 108.

In conventional fashion, a gas stream is generated in the kiln 102. The gas stream moves from the kiln 102 through a gas duct 110 to the lower cyclone 108. Gas entering cyclone 108 may be directed through portions of the cyclone and ultimately exits the cyclone 108 via duct 112. Duct 112 leads to the second cyclone 106. The gas stream enters cyclone 106 via duct 112 and is, in conventional fashion, directed to various areas within the cyclone. Ultimately, the gas stream exits cyclone 106 and enters main duct 130 that ultimately leads from cyclone 106 to a fan 132. An alkali bypass stream 160 is formed by withdrawing a portion of the main effluent gas stream exiting the kiln 102. This alkali bypass stream is typically treated in a separate gas cooling tower 161 and a high efficiency particulate matter control device 162. A fan 163 pulls the alkali bypass stream from the particulate matter control device 162 to a stack 164. The purpose of the alkali bypass stream is to relieve the system of sodium, potassium, sulfates, and/or chlorides.

Cyclones 106 and 108 are adapted to receive a conventional raw feed, typically limestone, and in some cases, additives such as clay and sand. The raw feed is typically directed through a feed line 114 into duct 112 carrying the gas stream from cyclone 108 to cyclone 106. The raw feed entering duct 112 mixes with the gas stream and is directed into cyclone 106 and gravitates downward through cyclone 106 while being preheated. The raw feed exits cyclone 106 through feed line 116. FIG. 2 depicts a feed line 116 that joins the gas stream duct 110. There, the raw feed mixes with the gas stream traveling in duct 110 and be directed into the lower cyclone, cyclone 108. Once in cyclone 108, the raw feed gravitates downward through the cyclone and, in the process, is preheated therein. Ultimately, the preheated raw feed exits cyclone 108 into feed line 118 that carries the preheated raw feed to kiln 102. In kiln 102, the raw feed is subjected to heating to approximately 2,800° F. and, during this course, cement clinker is produced, which is directed out the output end of kiln 102. The gas stream exiting cyclone 106 is directed into duct structure 130 that leads from the cyclone 106 ultimately to fan 132.

It is appreciated that there are numerous variations among the basic components of a cement manufacturing facility. For example, there can be any number of cyclones that form a part of the pyroprocessing system of a cement plant. In addition, and in the way of an example, some cement manufacturing plants do not include preheaters. The ammonia destruction process herein is readily adapted to destroying ammonia in preheater, preheater-precalciner, long dry, and wet type portland cement plants. Accordingly, the illustration discussed above and shown in FIG. 2 is principally for explanation purposes.

Disposed between cyclone 106 and fan 132 is a photochemical reactor indicated generally by the numeral 120. Reactor 120 includes a housing or duct structure 122 through which a gas stream passes, that is the gas stream moving from cyclone 106 to fan 132. Within the reactor 120 there is provided a series of UV lamps 124. Reactor 120 functions to remove ammonia from the gas stream passing therethrough in much the same manner as described in the Stage I process discussed with respect to FIG. 1.

It is contemplated that the lights 124 used in the reactor 120 would radiate light within a spectral range of 230 to 370 nanometers. This would entail UV light. The number of lights 124 used in reactor 120 could vary based upon the flow rate of the gas stream, the chemical make-up of the gas stream and other factors. However, it is contemplated that the lamps 124 would be selected so as to provide an intensity of 200 to 2,000 microwatts per square centimeter measured at 254 nanometers and 1,000 to 20,000 microwatts per square centimeter measured at 360 nanometers and, thereby, result in light absorption levels of 1 to 100 microwatts per actual cubic foot of gas treated. The light emitted by the lamps 124 in the spectral range of 230 to 370 nanometers would be absorbed by nitrogen oxides and organic compounds and would typically result in the formation of hydroxy and hydroperoxy radicals. These hydroxy and hydroperoxy radicals react with ammonia to yield the $NH_2$ radical that reacts further to yield $N_2$. It should be noted that the light intensity is preferably limited to avoid the formation of photochemical free radical reaction byproducts.

The gas stream exiting the fan 132 is directed to a high efficiency particulate matter filter chamber 140 similar to the chamber 16 shown in FIG. 1. After the gas stream has passed through the high efficiency particulate control systems, the filtered gas stream is exposed to another series of lights or lamps 150. This is essentially Stage II treatment. Details of the particulars for Stage II treatment will not be repeated here as they are essentially the same as discussed above with respect to Stage II and as shown in FIG. 1. However, Stage II would typically include lamps 150 having a spectral range of 230 to 370 nanometers. Like in the process discussed above and shown in FIG. 1, Stage II treatment in the case of the cement manufacturing facility focuses on the gas stream after particulate matter has been removed by a filtering process.

From Stage II, as shown in FIG. 2, the gas stream is directed through line 152 to a fan 154 that directs the gas stream to a stack 156.

Empirical Study of the Ammonia Reduction by Treatment of UV Radiation

An empirical study of the photochemical reduction of ammonia has been performed. A gas composition was produced to simulate a typical cement manufacturing industrial gas stream. A gas stream consisting of ammonia, nitric oxide, carbon monoxide, organic compounds, and air was treated with UV radiation. Ammonia concentrations were measured by a continuous emissions monitoring system with and without UV radiation treatment to determine reduction efficiency. The light spectra included 230 to 370 nanometers, and the light intensity was varied to establish a reduction efficiency range. A sample of the results are provided in Table 1.

TABLE 1

Photochemical Reduction Results

| Ammonia[1] (ppm) | NO (ppm) | Acetone (ppm) | CO (ppm) | $O_2$ (%) | Gas Flow Rate (l/mm) | Residence Time (Seconds) | Reduction Efficiency (%) |
|---|---|---|---|---|---|---|---|
| 114 | 266 | 15 | 113 | 12.4 | 2 | 26 | 47 |
| 28 | 437 | 28 | 258 | 8.3 | 1.8 | 20 | 90 |
| 28 | 400 | 23 | 212 | 7.2 | 2.4 | 8.5 | 47 |
| 21 | 460 | 22 | 200 | 7.0 | 4.3 | 5 | 20 |

[1]Untreated concentration

The invention claimed is:

1. A method of removing ammonia from an effluent gas stream comprising:
   a. irradiating with ultraviolet light a gas stream produced by an industrial process where the gas stream emitted from the industrial process contains ammonia at concentrations less than 40 ppm;
   b. substantially reducing the concentration of the ammonia present in the gas stream emitted by the industrial process by irradiating the gas stream with UV light in the spectral range of 230 to 370 nanometers to cause the photolysis of nitrogen dioxide ($NO_2$), ozone and hydrogen peroxide present and/or formed in the gas stream emitted by the industrial process;
   c. initiating a set of hydroxyl and hydroperoxy free radical reactions that result in the removal of a hydrogen atom from the ammonia to form an $NH_2$ radical wherein the initiation of the free radical reaction is a result of irradiating the gas stream with the UV light in the spectral range of 230 to 370 nanometers; and
   d. maintaining a $NO_x$ concentration in the gas stream at a concentration level sufficient to maintain in the gas stream the active set of hydroxyl and hydroperoxy free radical reactions.

2. The method of claim 1 wherein a set of free radicals formed to react with the ammonia are derived from nitrogen oxides, carbon monoxide, hydrocarbons, and water vapor.

3. The method of claim 1 further comprising removing particulate matter from the gas stream prior to irradiating the gas stream to form free radicals that react with the ammonia in the gas stream.

4. The method of claim 1 wherein the intensity of the irradiation falls in the range of 100–2,000 microwatts per square centimeter.

5. The method of claim 1 further comprising filtering particulate matter from the gas stream.

6. The method of claim 1 further comprising reducing the concentration of the ammonia in the gas stream from an initial concentration of less than 40 ppm by at least 40%.

7. The method of claim 1 wherein the ratio of the $NO_2$ concentration to NO concentration is maintained at less than a value of 10 to ensure that the sum of NO and $NO_2$ is not reduced more than 50%, and to ensure that sufficient $NO_2$ and NO remain to sustain the free radical reactions that remove ammonia.

* * * * *